United States Patent [19]

Bacskai

[11] Patent Number: 4,567,154

[45] Date of Patent: Jan. 28, 1986

[54] MIXED METAL ALKYL CATALYST FOR OLEFIN POLYMERIZATION

[75] Inventor: Robert Bacskai, Kensington, Calif.

[73] Assignee: Chevron Research Company, San Francisco, Calif.

[21] Appl. No.: 508,435

[22] Filed: Jun. 27, 1983

[51] Int. Cl.[4] .............................................. C08F 4/64
[52] U.S. Cl. .................................... 502/114; 502/115; 526/127; 526/125; 526/142; 526/151; 526/152
[58] Field of Search ................................. 502/114, 115

[56] References Cited

U.S. PATENT DOCUMENTS

| | | | |
|---|---|---|---|
| 3,746,694 | 7/1973 | Cluff | 502/114 X |
| 4,107,415 | 8/1978 | Giannini et al. | 502/109 X |
| 4,143,223 | 3/1979 | Toyota et al. | 502/105 X |
| 4,172,050 | 10/1979 | Gessell | 502/114 |
| 4,173,547 | 11/1979 | Graff | 502/115 X |
| 4,189,554 | 2/1980 | Nowlin | 502/115 X |
| 4,194,075 | 3/1980 | Dietz et al. | 502/115 X |
| 4,383,938 | 5/1983 | Langer | 502/169 X |

OTHER PUBLICATIONS

Chemical Abstracts, 96:69614c, (1982).

*Primary Examiner*—Patrick P. Garvin
*Attorney, Agent, or Firm*—J. A. Buchanan, Jr.; C. J. Caroli

[57] ABSTRACT

A catalyst composition for use in polymerizing alpha olefins which comprises a solid supported titanium complex and a cocatalyst comprising a mixture of an alkyl aluminum halide and a dialkyl magnesium or alkyl lithium compound.

10 Claims, No Drawings

MIXED METAL ALKYL CATALYST FOR OLEFIN POLYMERIZATION

BACKGROUND OF THE INVENTION

The present invention relates to a catalyst for use in the polymerization of alpha olefins. More particularly, the present invention relates to a catalyst system comprising a titanium-containing component and a second component comprising a mixture of an alkyl aluminum halide and a dialkyl magnesium or alkyl lithium compound.

It is known in the art that extremely reactive Ziegler-type catalysts can be prepared by reacting titanium tetrachloride with ethanol in the presence of a pulverized solid support, such as magnesium chloride. Frequently, esters of aromatic carboxylic acids are included in this preparation. The resulting solid complex is then mixed with a trialkyl aluminum compound, such as tri-isobutyl aluminum, to produce the final catalyst. When used to polymerize alpha olefins, these catalysts provide high yields of stereoregular polymer per part of catalyst. As a result, the catalyst normally does not have to be separated from the polymer to give a final polymer product of specification purity.

Accordingly, U.S. Pat. No. 4,143,223 describes a catalyst composition comprising a mechanically pulverized solid halogen-containing titanium catalyst component and an organoaluminum compound. The titanium catalyst component is obtained by reacting a titanium compound, such as titanium tetrachloride, with a pulverized solid product derived from a magnesium compound, an organic acid ester and an active hydrogen-containing compound selected from alcohols and phenols.

U.S. Pat. No. 4,107,415 describes a catalyst system comprising a catalyst-forming component which is an addition and/or substitution product of an electron-donor compound (or Lewis base) and an alkyl aluminum compound, and a supported catalyst-forming component obtained by contacting a titanium compound with a carrier which is a mixture of an active magnesium or manganese dihalide and a solid organic material which is inert to all other catalyst components. The electron-donor compound is typically an organic acid ester and the inert solid organic material is a compound such as durene, anthracene, acenaphthene or diphenyl.

Chemical Abstracts, 96:69614c (1982) describes a polymerization catalyst comprising an organic aluminum compound, such as triethyl aluminum, and a solid component obtained by reacting milled mixtures of magnesium dichloride, aromatic carboxylic acid esters and silicon tetrachloride with titanium tetrahalide in the presence of chlorinated hydrocarbons, such as dichloroethane.

SUMMARY OF THE INVENTION

The present invention provides an improved catalyst for polymerizing alpha olefins which comprises a solid supported titanium complex and a cocatalyst comprising a mixture of an alkyl aluminum halide and a dialkyl magnesium or alkyl lithium compound.

Among other factors, the present invention is based on my discovery that a mixed metal alkyl catalyst containing both an alkyl aluminum halide and a dialkyl magnesium or alkyl lithium compound is extremely effective in polymerizing alpha olefins to provide highly stereo-regular alpha olefin polymers in improved yield. This is particularly surprising in view of the fact that alkyl aluminum halides, which are known to form active Ziegler catalysts, by themselves do not provide effective olefin polymerization catalysts when mixed with solid supported titanium complexes. Similarly, dialkyl magnesium or alkyl lithium compounds by themselves do not produce good polymerization catalysts when mixed with titanium complexes.

Equally surprising, in view of the prior art teaching, is the discovery that a mixture of trialkyl aluminum and dialkyl magnesium (or alkyl lithium) does not form an active polymerization catalyst with the pulverized titanium complex.

Furthermore, it has been found that other mixed metal alkyls, such as the mixture of alkyl aluminum halide and alkyl zinc or the mixture of alkyl aluminum halide and alkyl boron, also provide inactive polymerization catalysts.

DETAILED DESCRIPTION OF THE INVENTION

The catalyst system of the present invention contains a pulverized solid supported titanium complex component and a cocatalyst component which comprises a mixture of an alkyl aluminum halide and a dialkyl magnesium or alkyl lithium compound.

The titanium complex catalyst component may be any of the conventional solid titanium-containing complexes used in polymerizing alpha olefins. These titanium-containing catalyst components are well known in the art and are described, for example, in the aforementioned U.S. Pat. Nos. 4,143,223 and 4,107,415, and in Chemical Abstracts, 96:69614c (1982).

In general, the titanium complexes are obtained by contacting a titanium compound with a pulverized solid support, or carrier. Typically, the titanium compound will be a titanium tetrahalide, although other titanium compounds are suitable, such as alkoxytitanium halides. The preferred titanium compound is titanium tetrachloride.

The pulverized solid support will normally contain a magnesium compound, preferably a magnesium dihalide and more preferably, magnesium dichloride. Other magnesium compounds contemplated include alkoxy magnesium halides, aryloxy magnesium halides, and the like. Manganese dihalides may also be used in place of magnesium dihalides. The magnesium or manganese compounds should preferably be anhydrous.

Additionally, it is preferable to include a carboxylic acid ester in the final titanium complex. The carboxylic acid ester may be included as part of the pulverized solid support or it may be separately added to the titanium compound. Aromatic carboxylic acid esters are preferred, the most preferred being ethyl benzoate.

Other compounds have been variously described in the literature as useful in forming the titanium complexes. These compounds include alcohols such as ethanol; phenols such as cresol; silicon tetrachloride; and inert solid organic compounds such as durene, anthracene, acenaphthene and diphenyl. Often these compounds are introduced as part of the pulverized solid support.

The solid support may be pulverized in a ball mill, a vibratory mill, an impact mill, or the like, preferably under dry conditions in the absence of an inert diluent.

Suitable titanium complexes which are useful for forming the catalyst of the present invention include complexes comprising magnesium dichloride, ethyl benzoate, ethanol and titanium tetrachloride; complexes comprising magnesium dichloride, ethyl benzoate, cresol and titanium tetrachloride; complexes comprising magnesium dichloride, ethyl benzoate, durene and titanium tetrachloride; and complexes comprising magnesium dichloride, ethyl benzoate, silicon tetrachloride and titanium tetrachloride.

The mixed metal alkyl component of the present catalyst comprises a mixture of an alkyl aluminum halide and a dialkyl magnesium or alkyl lithium compound. The alkyl aluminum halides which are suitable include dialkyl aluminum halides, alkyl aluminum dihalides, and alkyl aluminum sesquihalides having the empirical formula: $Al_2R_3X_3$, where R is alkyl and X is halogen. Generally, the alkyl group will contain from 2 to 8 carbon atoms. Preferred alkyl aluminum halides are the alkyl aluminum chlorides, more preferably, the dialkyl aluminum chlorides. A preferred dialkyl aluminum chloride is diethyl aluminum chloride.

The dialkyl magnesium compounds suitable for use in the catalyst of the invention are those having alkyl groups of 2 to 8 carbon atoms. Representative examples include dioctyl magnesium, dipropyl magnesium, ethyl propyl magnesium, and the like. A preferred magnesium compound is dibutyl magnesium. Similarly, the alkyl lithium compounds suitable for use contain alkyl groups of 2 to 8 carbon atoms. Representative lithium compounds include ethyl lithium, propyl lithium, octyl lithium, and the like. A preferred lithium compound is butyl lithium.

The mixture of the alkyl aluminum halide and the dialkyl magnesium or alkyl lithium compound has an aluminum to magnesium (or lithium) molar ratio of 1:5 to 5:1, preferably about 2:1. In a preferred embodiment, a small amount of a Lewis base is included in the aluminum-magnesium or aluminum-lithium mixture. Usually, from about 0.05 to 0.5 moles of Lewis base per mole of total aluminum plus magnesium, or total aluminum plus lithium, are sufficient. Preferred Lewis bases are the carboxylic acid esters, more preferably, the aromatic carboxylic acid esters. An especially preferred Lewis base is ethyl benzoate.

The alpha olefins are polymerized in contact with the present catalysts under conventional polymerization conditions. Polymerization is conducted at temperatures ranging from about 0° C. to 100° C., preferably from about 20° C. to 70° C. Polymerization pressure is generally about 3 to 16 atmospheres, preferably from about 5 to 10 atmospheres. The reaction is normally carried out over a period of about 1 to 24 hours.

The polymerization can be carried out either in the liquid or gaseous phase. When it is carried out in the liquid phase, an inert organic solvent can be used as a reaction medium or the olefin itself can be used as the reaction medium. Examples of inert organic solvents include aliphatic hydrocarbons of 4 to 8 carbon atoms such as hexane or heptane; cycloaliphatic hydrocarbons such as cyclohexane; and aromatics such as benzene, toluene or xylene.

In general, the alpha olefins suitable for use in polymerization include olefins having from about 2 to 8, preferably 2 to 5, carbon atoms. Typical olefins include ethylene, propylene, 1-butene, 4-methyl-1-pentene, 1-hexene, and the like. The present catalyst system is particularly useful in the polymerization of propylene and 1-butene.

The regulation of the polymer molecular weight during the polymerization is effected according to known techniques by operating, for instance, in the presence of hydrogen. The presence of hydrogen as a molecular weight modifier, operating with the catalysts of the present invention, does not appreciably reduce the activity and/or stereospecificity of the catalysts.

The polymerization can be carried out by any of batchwise, semi-continuous or continuous methods. It is also possible to perform the polymerization in two or more stages under different reaction conditions.

The following examples are provided to illustrate the invention in accordance with the principles of the invention but are not to be construed as limiting the invention in any way except as indicated by the appended claims.

EXAMPLES

In the following examples, the amount of stereoregular polymer formed was determined by Soxhlet extraction of the total polymer product over a period of 6 hours. An n-heptane solvent was used for polypropylene and an ether solvent was used for poly-1-butene.

The specific viscosity was determined for poly-1-butene using a Decalin solvent at 115° C. and a concentration of 0.1 g per 100 ml of solvent. The specific viscosity was determined for polypropylene using a Decalin solvent at 135° C. and a concentration of 0.1 g per 100 ml of solvent.

Abbreviations used in the examples include "Et" for ethyl, "Bu" for butyl, and "i-Bu" for isobutyl.

Example 1

Polymerizations were carried out in a 1-liter, stainless steel autoclave. Before each run, the autoclave was heated to 120° C. for 2 hours and cooled to room temperature in dry, oxygen-free nitrogen. The propylene (99+%) used was dried over silica gel (Davison Grade 923) and the n-hexane solvent was dried over molsieve (Linde 1/16 inch pellets, 4A). All operations were performed under nitrogen.

For this example, the autoclave was charged with 163 g n-hexane, 1.4 mM AlEt$_2$Cl (25% solution in toluene), 0.7 mM MgBu$_2$ (0.71 molar in heptane), 0.47 mM ethyl benzoate, and 0.031 g of an MgCl$_2$/ethyl benzoate/SiCl$_4$/TiCl$_4$ (Ti=1.90%) catalyst (0.589 mg Ti; 0.0123 mM Ti), prepared according to Chemical Abstracts, 96:69614c (1982), and 125 g liquid propylene. The autoclave was heated to 50° C. and was maintained at 50° C. for 3 hours. When necessary, cooling was applied by an internal water coil. Following polymerization, the autoclave was vented and the product was washed with methanol and dried in vacuum at 70°–80° C. (Alternatively, the polymer could be isolated by evaporation of the solvent.) The polymer yield was 118 g, corresponding to 200,300 g polypropylene/g Ti. Propylene conversion was 94% and the yield of n-heptane insoluble polymer was 92%. The reduced specific viscosity was 4.4 dl/g.

Examples 2 to 16

Following the procedure of Example 1, 1-butene was polymerized with catalysts containing a titanium complex of magnesium dichloride, ethyl benzoate, ethanol and titanium tetrachloride, and a cocatalyst mixture of diethyl aluminum chloride and dibutyl magnesium. The results are shown in Table I. Various trialkyl aluminum cocatalysts are also shown for comparison.

TABLE I

Polymerization of Pure 1-Butene With AlEt$_2$Cl + MgBu$_2$[a]

| Example | Catalyst[c] | Cocatalyst[b] | Yield g | Yield g PB/g Ti | Ether Insoluble % | Reduced Specific Viscosity, $\eta_{sp}/C$ |
|---|---|---|---|---|---|---|
| 2 | A | AlEt$_2$Cl + MgBu$^2$ | 205.4 | 78,981 | 40.2 | 2.5 |
| 3 | A | AlEt$_2$Cl + MgBu$_2$ + Et Benzoate | 7.2 | 2,781 | 91.6 | 13.7 |
| 4 | A | AlEt$_2$Cl | 0.8 | 312 | — | 3.0 |
| 5 | A | MgBu$_2$ | Trace | — | — | — |
| 6 | A | AlEt$_2$Cl + BEt$_3$ | Trace | — | — | — |
| 7 | A | Al(i-Bu)$_3$ | 54.1 | 20,800 | 67.6 | 5.6 |
| 8 | A | Al(i-Bu)$_3$ + MgBu$_2$ | Trace | — | — | — |
| 9 | A | Al(i-Bu)$_3$ + Et Benzoate | 4.3 | 1,662 | 91.2 | 12.2 |
| 10 | A | AlEt$_3$ | Trace | — | — | — |
| 11 | A | AlEt$_3$ + MgBu$_2$ | Trace | — | — | — |
| 12 | B | AlEt$_2$Cl + MgBu$_2$ | 237.0 | 91,269 | 61.4 | 1.8 |
| 13 | B | AlEt$_2$Cl + MgBu$_2$ + Et Benzoate | 229.0 | 88,150 | 76.0 | 2.5 |
| 14 | B | Al(i-Bu)$_3$ | 102.5 | 39,438 | 82.0 | 4.1 |
| 15 | B | Al(i-Bu)$_3$ + MgBu$_2$ | Trace | — | — | — |
| 16 | B | Al(i-Bu)$_3$ + Et Benzoate | 125.5 | 48,269 | 70.2 | 3.4 |

[a] 100 ml n-hexane; 220 g 1-butene; 2.6 mg Ti catalyst (0.054 mM) — Room temperature, 1 hour

[b] Al—alkyl = 5.60 mM
MgBu$_2$ = 2.80 mM
Et Benzoate = 1.90 mM (Examples 3, 9)
Et Benzoate = 0.32 mM (Examples 13, 16)

[c] A = MgCl$_2$—Et Benzoate—EtOH—TiCl$_4$; Ti = 4.12%; Centrifugal-type ball mill ground
B = MgCl$_2$—Et Benzoate—EtOH—TiCl$_4$; Ti = 1.34%; Centrifugal-type ball mill ground

Examples 17 to 25

Following the procedure of Example 1, a mixture of 50% 1-butene and 50% 2-butene was polymerized with catalysts containing a titanium complex of magnesium dichloride, ethyl benzoate, ethanol and titanium tetrachloride, and a cocatalyst mixture of diethyl aluminum chloride and dibutyl magnesium. The results are shown in Table II. Various trialkyl aluminum cocatalysts are also shown for comparison.

Examples 26 to 36

Following the procedure of Example 1, propylene was polymerized with catalysts containing a titanium complex of magnesium dichloride, ethyl benzoate, ethanol and titanium tetrachloride, and a cocatalyst mixture of diethyl aluminum chloride and dibutyl magnesium. The results are shown in Table III. Trialkyl aluminum cocatalysts are also shown for comparison.

TABLE II

Polymerization of Mixed-Butene With AlEt$_2$Cl + MgBu$_2$[a]

| Example | Catalyst[c] | Cocatalyst[b] | Yield g | Yield g PB/g Ti | Ether Insoluble % |
|---|---|---|---|---|---|
| 17 | B | AlEt$_2$Cl + MgBu$_2$ | 97.6 | 37,538 | 40.0 |
| 18 | B | AlEt$_2$Cl + MgBu$_2$ + Et Benzoate | 13.4 | 5,154 | 84.4 |
| 19 | B | Al(i-Bu)$_3$ | 23.2 | 8,923 | 68.6 |
| 20 | C | AlEt$_2$Cl + MgBu$_2$ | 92.0 | 35,392 | 28.4 |
| 21 | C | AlEt$_2$Cl + MgBu$_2$ + Et Benzoate | 7.6 | 2,931 | 82.4 |
| 22 | C | Al(i-Bu)$_3$ | 23.6 | 9,077 | 69.2 |
| 23 | C | Al(i-Bu)$_3$ + MgBu$_2$ | Trace | — | — |
| 24 | C | AlEt$_3$ | 10.5 | 4,027 | 50.6 |
| 25 | C | AlEt$_3$ + MgBu$_2$ | Trace | — | — |

[a] 100 ml n-hexane; 220 g mixed-butene; 2.6 mg Ti catalyst (0.054 mM Ti) — Room temperature, 1 hour

[b] Al—alkyl = 5.60 mM
MgBu$_2$ = 2.80 mM
Et Benzoate = 0.63 mM

[c] B = MgCl$_2$—Et Benzoate—EtOH—TiCl$_4$; Ti = 1.34%; Centrifugal-type ball mill ground
C = MgCl$_2$—Et Benzoate—EtOH—TiCl$_4$; Ti = 3.93%; Ball mill ground

TABLE III

Polymerization of Propylene With AlEt$_2$Cl + MgBu$_2$[a]

| Example | Ti Catalyst[c] | Cocatalyst[b] | Yield g | Yield g PP/g Ti | n-Heptane Insoluble % | Reduced Specific Viscosity, $\eta_{sp}/C$ |
|---|---|---|---|---|---|---|
| 26 | A | AlEt$_2$Cl + MgBu$_2$ | 164.4 | 63,250 | 58.0 | 1.6 |
| 27 | A | AlEt$_2$Cl + MgBu$_2$ + Et Benzoate | 58.4 | 22,481 | 92.2 | 7.8 |
| 28 | A | AlEt$_2$Cl | 15.9 | 6,131 | 49.0 | 2.3 |
| 29 | A | Al(i-Bu)$_3$ | 89.3 | 34,338 | 42.0 | 2.3 |

TABLE III-continued

Polymerization of Propylene With AlEt$_2$Cl + MgBu$_2$$^a$

| Example | Ti Catalyst$^c$ | Cocatalyst$^b$ | Yield g | Yield g PP/g Ti | n-Heptane Insoluble % | Reduced Specific Viscosity, $\eta_{sp}$/C |
|---|---|---|---|---|---|---|
| 30 | A | Al(i-Bu)$_3$ + Et Benzoate | 2.6 | 996 | 99.0 | Insoluble |
| 31 | C | AlEt$_2$Cl + MgBu$_2$ | 158.7 | 61,038 | 57.2 | 1.6 |
| 32 | C | AlEt$_2$Cl + MgBu$_2$ + Et Benzoate | 70.6 | 27,154 | 92.4 | 3.0 |
| 33 | C | AlEt$_2$Cl | 18.7 | 7,192 | 44.0 | — |
| 34 | C | Al(i-Bu)$_2$ | 144.0 | 55,385 | 45.0 | 1.4 |
| 35 | C | Al(i-Bu)$_3$ + MgBu$_2$ | 7.0 | 2,692 | 64.6 | — |
| 36 | C | Al(i-Bu)$_3$ + Et Benzoate | 42.7 | 16,423 | 86.6 | 2.8 |

$^a$100 ml n-hexane  
2.6 mg Ti catalyst (0.054 mM)  } 120 psi propylene, 50° C., 3 hours  
$^b$Al—alkyl = 5.60 mM  
MgBu$_2$ = 2.80 mM  
Et Benzoate = 1.90 mM  
$^c$A = MgCl$_2$—Et Benzoate—EtOH—TiCl$_4$; Ti = 4.12%; Centrifugal-type ball mill ground  
C = MgCl$_2$—Et Benzoate—EtOH—TiCl$_4$; Ti = 3.93%; Ball mill ground

Examples 37 to 56

Propylene, 1-butene, and a 50/50 mixture of 1-butene and 2-butene were polymerized following the procedure of Example 1. Various catalysts were employed containing a titanium complex and an alkyl aluminum cocatalyst. The results which are shown in Table IV demonstrate the effect of dibutyl magnesium on various alkyl aluminum cocatalysts. More specifically, Table IV shows that dibutyl magnesium activates alkyl aluminum halides for olefin polymerization while it completely deactivates aluminum trialkyls.

Examples 57 to 73

Following the procedure of Example 1, propylene was polymerized using various mixed metal alkyl cocatalysts. The results are summarized in Table V. Table V demonstrates that dialkyl magnesium and alkyl lithium provide active cocatalysts when combined with alkyl aluminum halides, whereas other metal alkyls, such as dialkyl zinc and trialkyl boron, give inactive cocatalysts when combined with alkyl aluminum halides. Table V further demonstrates that butyl lithium and dibutyl magnesium deactivate the otherwise active trialkyl aluminum cocatalysts.

TABLE IV

Effect of MgBu$_2$ on Al—Alkyl Catalysts

| Example | Monomer | Catalyst* | Cocatalyst | Yield g | g Polymer/g Ti | Insoluble % | Reduced Specific Viscosity, $\eta_{sp}$/C |
|---|---|---|---|---|---|---|---|
| 37 | 1-Butene | A | AlEt$_2$Cl | 0.8 | 312 | — | 3.0 |
| 38 | 1-Butene | A | AlEt$_2$Cl + MgBu$_2$ | 205.4 | 78,981 | 40.2 | 2.5 |
| 39 | 1-Butene | B | AlEt$_2$Cl + MgBu$_2$ | 237.0 | 91,269 | 61.4 | 1.8 |
| 40 | 1-Butene | A | AlEtCl$_2$ | None | — | — | — |
| 41 | 1-Butene | A | AlEtCl$_2$ + MgBu$_2$ | 65.6 | 25,246 | 51.6 | 2.4 |
| 42 | 1-Butene | A | Al(i-Bu)$_3$ | 54.1 | 20,800 | 67.6 | 5.6 |
| 43 | 1-Butene | A | Al(i-Bu)$_3$ + MgBu$_2$ | Trace | — | — | — |
| 44 | 1-Butene | B | Al(i-Bu)$_3$ | 102.5 | 39,438 | 82.0 | 4.1 |
| 45 | 1-Butene | B | Al(i-Bu)$_3$ + MgBu$_2$ | Trace | — | — | — |
| 46 | 1-Butene | A | AlEt$_3$ | Trace | — | — | — |
| 47 | 1-Butene | A | AlEt$_3$ + MgBu$_2$ | Trace | — | — | — |
| 48 | Mixed-Butene | C | AlEt$_2$Cl + MgBu$_2$ | 92.0 | 35,392 | 28.4 | — |
| 49 | Mixed-Butene | C | Al(i-Bu)$_3$ | 23.6 | 9,077 | 69.2 | — |
| 50 | Mixed-Butene | C | Al(i-Bu)$_3$ + MgBu$_2$ | Trace | — | — | — |
| 51 | Mixed-Butene | C | AlEt$_3$ | 10.6 | 4,027 | 50.6 | — |
| 52 | Mixed-Butene | C | AlEt$_3$ + MgBu$_2$ | Trace | — | — | — |
| 53 | Propylene | C | AlEt$_2$Cl | 18.7 | 7,192 | 44.0 | — |
| 54 | Propylene | C | AlEt$_2$Cl + MgBu$_2$ | 158.7 | 61,038 | 57.2 | — |
| 55 | Propylene | C | Al(i-Bu)$_3$ | 144.0 | 55,385 | 45.0 | — |
| 56 | Propylene | C | Al(i-Bu)$_3$ + MgBu$_2$ | 7.0 | 2,692 | 64.6 | — |

*A = MgCl$_2$—Et Benzoate—EtOH—TiCl$_4$; Ti = 4.12%; Centrifugal-type ball mill ground  
B = MgCl$_2$—Et Benzoate—EtOH—TiCl$_4$; Ti = 1.34%; Centrifugal-type ball mill ground  
C = MgCl$_2$—Et Benzoate—EtOH—TiCl$_4$; Ti = 3.93%; Ball mill ground

TABLE V

Polymerization of Propylene$^a$ - Effect of Cocatalyst$^b$

| Example | Cocatalyst | (mM) | Yield g | g PP/g Ti | Conv. % | n-Heptane Insoluble % | Reduced Specific Viscosity, $\eta_{sp}$/C |
|---|---|---|---|---|---|---|---|
| 57 | AlEt$_2$Cl | (1.4) | 10.0 | 17,000 | 8.0 | 22.0 | 1.0 |
| 58 | MgBu$_2$ | (0.7) | 0.5 | 849 | 0.4 | | |

TABLE V-continued

Polymerization of Propylene[a] - Effect of Cocatalyst[b]

| Example | Cocatalyst | (mM) | Yield g | g PP/g Ti | Conv. % | n-Heptane Insoluble % | Reduced Specific Viscosity, $\eta_{sp}/C$ |
|---|---|---|---|---|---|---|---|
| 59 | AlEt$_2$Cl/MgBu$_2$ | (1.4/0.7) | 122.0 | 207,100 | 98.0 | 50.0 | 1.6 |
| 60 | AlEt$_2$Cl/Mg(C$_6$H$_{13}$)$_2$ | (1.4/0.7) | 28.0 | 47,500 | 22.0 | 55.0 | 2.4 |
| 61 | AlEt$_2$Cl/LiBu | (1.4/1.4) | 86.0 | 146,000 | 69.0 | 52.0 | 1.5 |
| 62 | AlEt$_2$Cl/ZnEt$_2$ | (1.4/0.7) | 2.0 | 3,400 | 2.0 | | |
| 63 | AlEt$_2$Cl/BEt$_3$ | (1.4/0.7) | 7.0 | 11,900 | 6.0 | | 2.3 |
| 64 | AlEtCl$_2$ | (1.4) | 0.0 | 0 | 0.0 | 0.0 | |
| 65 | AlEtCl$_2$/MgBu$_2$ | (1.4/0.7) | 67.0 | 114,000 | 54.0 | 40.0 | 1.8 |
| 66 | AlEtCl$_2$/MgBu$_2$ | (1.4/1.4) | 23.0 | 39,000 | 18.0 | 59.0 | 2.2 |
| 67 | Al(i-Bu)$_3$ | (1.4) | 119.0 | 202,000 | 95.0 | 40.0 | 1.6 |
| 68 | Al(i-Bu)$_3$/MgBu$_2$ | (1.4/0.7) | 9.0 | 15,300 | 7.0 | 80.0 | 1.4 |
| 69 | Al(i-Bu)$_3$/Mg(C$_6$H$_{13}$)$_2$ | (1.4/0.7) | 0.0 | 0 | 0.0 | 0.0 | |
| 70 | Al(-Bu)$_3$/LiBu | (1.4/1.4) | Trace | Trace | — | — | — |
| 71 | AlEt$_3$ | (1.4) | 78.0 | 132,400 | 62.0 | 48.0 | 2.4 |
| 72 | AlEt$_3$/MgBu$_3$ | (1.4/0.7) | 5.0 | 8,500 | 4.0 | | 2.7 |
| 73 | Al(i-Bu)$_3$/MgBu$_3$/AlEt$_2$Cl | (1.4/0.7/1.4) | 99.0 | 168,100 | 79.0 | 40.0 | 2.1 |

[a] 163 g n-hexane, 125 g propylene, 50° C. 3 hours
[b] Catalyst = 0.589 mg Ti (0.0123 mM); MgCl$_2$/Et Benzoate/SiCl$_4$/TiCl$_4$

Examples 74 to 83

Following the procedure of Example 1, propylene was polymerized with catalysts containing various supported titanium tetrachloride complexes and mixed metal alkyl cocatalysts. The results are shown in Table VI. Table VI demonstrates the superior performance of the mixed metal alkyl cocatalysts, as compared to trialkyl aluminum cocatalysts, when combined with a broad range of supported titanium catalysts.

TABLE VI

Polymerization of Propylene - Catalyst Comparison

| Example | Propylene (99.9+%) | Catalyst | Ti in Catalyst % | Ti mg | Cocatalyst | (mM) | Time hrs. | Temp. °C. | Yield g PP/g Ti | n-Heptane Insoluble % |
|---|---|---|---|---|---|---|---|---|---|---|
| 74 | Liquid | MgCl$_2$/Durene/TiCl$_4$—Et Benzoate | 3.05 | 1.28 | AlEt$_2$Cl MgBu$_2$ p-methoxy-Et Benzoate | 2.40 1.20 0.90 | 5 | 65 | 63,000 | 93 |
| 75 | Liquid | MgCl$_2$/Durene/TiCl$_4$—Et Benzoate | 3.05 | 1.28 | AlEt$_3$ p-methoxy-Et Benzoate | 2.40 0.90 | 5 | 65 | 30,000 | 94 |
| 76 | 120 psi | MgCl$_2$/Et Benzoate/EtOH/TiCl$_4$ | 3.93 | 2.59 | AlEt$_2$Cl MgBu$_2$ Et Benzoate | 5.60 2.80 1.90 | 3 | 50 | 27,000 | 92 |
| 77 | 120 psi | MgCl$_2$/Et Benzoate/EtOH/TiCl$_4$ | 3.93 | 2.59 | Al(i-Bu)$_3$ Et Benzoate | 5.60 1.90 | 3 | 50 | 16,000 | 87 |
| 78 | 120 psi | MgCl$_2$/Et Benzoate/o-Cresol/TiCl$_4$ | 3.66 | 0.92 | AlEt$_2$Cl MgBu$_2$ Et Benzoate | 1.40 0.70 0.47 | 3 | 50 | 69,000 | 85 |
| 79 | 120 psi | MgCl$_2$/Et Benzoate/o-Cresol/TiCl$_4$ | 3.66 | 0.92 | Al(i-Bu)$_3$ Et Benzoate | 1.40 0.47 | 3 | 50 | 32,000 | 86 |
| 80 | 120 psi | MgCl$_2$/Et Benzoate/SiCl$_4$/TiCl$_4$ | 5.81 | 0.87 | AlEt$_2$Cl MgBu$_2$ Et Benzoate | 1.40 0.70 0.47 | 3 | 50 | 131,000 | 88 |
| 81 | 120 psi | MgCl$_2$/Et Benzoate/SiCl$_4$/TiCl$_4$ | 5.81 | 0.87 | Al(i-Bu)$_3$ Et Benzoate | 1.40 0.47 | 3 | 50 | 75,000 | 92 |
| 82 | Liquid | MgCl$_2$/SiCl$_4$/TiCl$_4$ | 1.90 | 0.59 | AlEt$_2$Cl Et Benzoate | 1.40 0.47 | 3 | 50 | 200,000 | 92 |
| 83 | Liquid | MgCl$_2$/Et Benzoate/SiCl$_4$/TiCl$_4$ | 1.90 | 0.59 | Al(i-Bu)$_3$ Et Benzoate | 1.40 0.47 | 3 | 50 | 120,000 | 91 |

Examples 84–87

Following the procedure of Example 1, refinery propylene was polymerized using a cocatalyst mixture of diethyl aluminum chloride and dibutyl magnesium. The results are summarized in Table VII. A trialkyl aluminum cocatalyst is shown for comparison. Table VII demonstrates the superior performance of the mixed metal alkyl cocatalyst, as compared to trialkyl aluminum, in polymerizing propylene from a relatively impure refinery feed.

TABLE VII

Polymerization of Refinery Propylene[a]

| Example | Ti[b] mg | Cocatalyst AlEt$_2$Cl/MgBu$_2$/Et Benzoate mM | | | Al(i-Bu)$_3$/Et Benzoate mM | | Yield g | g PP/g Ti | Conv. % | n-Heptane Insoluble % | Reduced Specific Viscosity $\eta_{sp}$/C |
|---|---|---|---|---|---|---|---|---|---|---|---|
| 84 | 0.589 | 1.4 | 0.7 | 0.47 | | | 57 | 97,000 | 46 | 89 | 2.8 |
| 85 | 1.178 | 2.8 | 1.4 | 0.94 | | | 106 | 90,000 | 85 | 92 | 4.0 |
| 86 | 1.178 | 2.8 | 1.4 | 1.29 | | | 75 | 63,700 | 60 | 97 | |
| 87 | 1.178 | | | | 2.8 | 0.94 | 56 | 47,500 | 45 | 94 | |

Analysis of Refinery Propylene

| Component | % |
|---|---|
| propylene | 57.80 |
| propane | 21.30 |
| isobutane | 13.10 |
| n-butane | 0.30 |
| 1-butene | 1.70 |
| isobutylene | 2.50 |
| trans-2-butene | 0.45 |
| cis-2-butene | 0.13 |

[a]50° C., 3 hours
51 g n-hexane
216 g refinery propylene (125 g propylene)
[b]Catalyst = MgCl$_2$/Et Benzoate/SiCl$_4$/TiCl$_4$; Ti = 1.90%

What is claimed is:

1. A catalyst composition for use in polymerizing alpha olefins which comprises a solid supported titanium tetrahalide complex and a cocatalyst comprising a mixture of an alkyl aluminum halide and an alkyl lithium compound.

2. The composition according to claim 1, wherein the cocatalyst comprises a mixture of a dialkyl aluminum chloride and an alkyl lithium compound.

3. The composition according to claim 2, wherein the cocatalyst comprises a mixture of diethyl aluminum chloride and butyl lithium.

4. The composition according to claim 1, wherein the molar ratio of aluminum to lithium is 1:5 to 5:1.

5. The composition according to claim 1, wherein the cocatalyst further comprises a Lewis base.

6. The composition according to claim 5, wherein the Lewis base is an aromatic carboxylic acid ester.

7. The composition according to claim 6, wherein the Lewis base is ethyl benzoate.

8. The composition according to claim 1, wherein the supported titanium complex comprises a titanium tetrahalide, a magnesium dihalide, an aromatic carboxylic acid ester and an alcohol or phenol.

9. The composition according to claim 1, wherein the supported titanium complex comprises a titanium tetrahalide, magnesium dihalide, an aromatic carboxylic acid ester and an inert solid organic compound selected from the group consisting of durene, anthracene, acenaphthene and diphenyl.

10. The composition according to claim 1, wherein the supported titanium complex comprises a titanium tetrahalide, a magnesium dihalide, an aromatic carboxylic acid ester and silicon tetrachloride.

* * * * *

UNITED STATES PATENT AND TRADEMARK OFFICE
CERTIFICATE OF CORRECTION

PATENT NO. : 4,567,154
DATED : January 28, 1986
INVENTOR(S) : ROBERT BACSKAI

It is certified that error appears in the above-identified patent and that said Letters Patent are hereby corrected as shown below:

Column 9, Table V, Examples 72 and 73, "$MgBu_3$" should read --$MgBu_2$--.

Column 10, Table VI, Example 82, "Cocatalyst" column, immediately below "$AlEt_2Cl$", please insert --$MgBu_2$--.

Column 10, Table VI, Example 82, "(mM)" column, immediately below "1.40", please insert --0.70--.

Signed and Sealed this
Twenty-eighth Day of October, 1986

[SEAL]

*Attest:*

DONALD J. QUIGG

*Attesting Officer*     *Commissioner of Patents and Trademarks*